Dec. 3, 1968  A. S. PEARSON ET AL  3,413,690

FASTENER STUD FOR ASSEMBLY IN AN APERTURED SUPPORT

Filed Feb. 24, 1967

INVENTORS:
ARTHUR STANLEY PEARSON
DAVID JULIAN FORD &
ROBERT MICHAEL CLARKE,
BY Philip E. Parker
ATTORNEY United States Patent Office 3,413,690
Patented Dec. 3, 1968

3,413,690
FASTENER STUD FOR ASSEMBLY IN
AN APERTURED SUPPORT
Arthur Stanley Pearson, Sherwood, and David Julian Ford and Robert Michael Clarke, Stapleford, England, assignors, by mesne assignments, to United-Carr Incorporated, Boston, Mass., a corporation of Delaware
Filed Feb. 24, 1967, Ser. No. 618,363
Claims priority, application Great Britain, Mar. 1, 1966, 8,923/66
3 Claims. (Cl. 24—73)

ABSTRACT OF THE DISCLOSURE

A stud formed as a one-piece moulding of synthetic plastics including opposed flexible arms the free ends of which are connected by an integral bridging element.

This invention relates to a fastener stud for assembly in an aperture in a support to secure another member thereto.

It is known to provide a fastener stud to be inserted into an aperture in a support including opposed flexible arms. In such known stud fasteners the flexible arms have a single point of flexure, namely, at their connection with the head or base of the fastener and as a result the arms do not always provide a sufficient grip with the edges of the aperture to hold the stud satisfactorily in assembly. The present invention aims to overcome this drawback by providing additional resilient means at the free ends of the arms adapted to augment the gripping action of the arms.

According to the present invention, a stud for snapping engagement into an aperture in a support comprises a one-piece moulding of resilient synthetic plastics including a head connected to snap fastener means by a neck, the snap fastener means comprising opposed flexible arms having their inner ends integral with the neck and their outer ends connected by an integral flexible transverse bridge element which extends inwardly between the outer ends of the arms.

The bridge element preferably comprises a thin web which is arcuately curved having a concavely curved face directed outwardly of the arms and a convexly curved inner face directed towards the headed end of the stud. When the stud is inserted into the aperture in the support, the arms on engagement with the edges of the aperture will flex inwardly towards one another and when fully inserted will tend to revert to their original position to make frictional engagement with the edges of the aperture. In flexing inwardly the bridge element will also be flexed and in tending to revert to its normal position will assist the outward flexing movement of the arms. By making the bridge element of the stud convexo/concavo shape, it will have three points of flexing, namely, at the point of junction of the opposite sides of the bridge element with the respective arms and along a transverse line coincident with the radius of curvature of the concave face.

To enable the invention to be fully understood, it will now be described, by way of example, with reference to the accompanying drawings in which.

Figure 1:
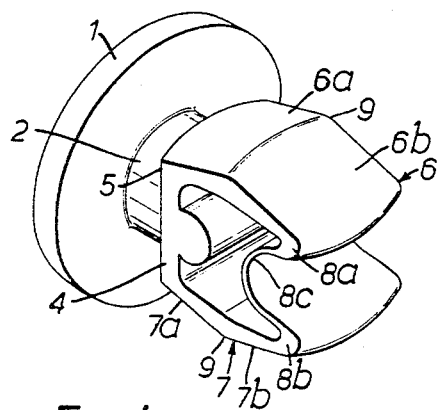
FIGURE 1 is a perspective view of a stud fastener according to one embodiment of the invention.
Figure 2:
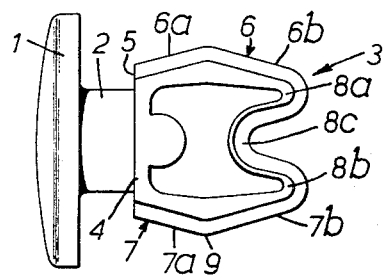
FIGURE 2 is a side elevation thereof.
Figure 3:
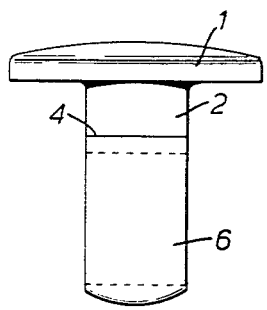
FIGURE 3 is a side elevation taken at right angles to that of FIGURE 2.
Figure 4:
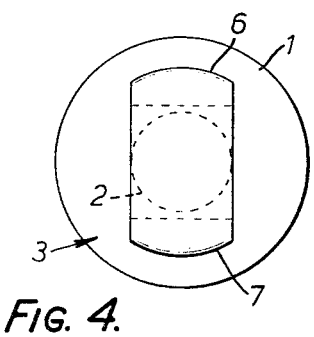
FIGURE 4 is an under plan view of the stud fastener.

As shown in the drawings, the stud fastener comprises a one-piece moulding of resilient synthetic plastics including a head 1, neck 2 and fastener means generallly indicated by 3.

The fastener means comprises base portions 4, 5, extending integrally at right angles to the neck 2 and in spaced parallel relation to the underface of the head 1. Flexible arms 6, 7, are formed integral with the outer ends of the respective base portions and extend in opposed substantially parallel relation to one another in a direction away from the head 1, the outer ends of the arms being connected by a thin web-like bridge element 8 which, as shown, is arcuately curved to provide a concave surface directed outwardly of the arms and a convex surface extending inwardly between the arms and directed towards the headed end of the stud.

The outer surface of the arms 6, 7, includes outwardly and inwardly sloping portions 6a, 6b, 7a, 7b defining a shoulder 9 at the junction of the inner ends of said surfaces.

The stud is adapted to be inserted into the aperture in a support to secure another member thereto, and according to one particular application of the invention is adapted to be inserted through aligned apertures in a panel and a support to secure the two parts in assembly.

The fastener means 3 is adapted to make snap fastener engagement in the aperture in the support, and as it is inserted the arms 6, 7, will, on engagement with the edges of the aperture, be flexed inwardly. The arms are inserted through the aperture until the shoulders 9 pass the inner edge so that the stud will be retained by the underface of the head 1 overlying one face of the support or the outer face of an apertured panel to be secured thereto while the shoulders 9 overlie the opposite face of the support. The arms will be urged into resilient frictional gripping engagement with the edges of the aperture by the inherent resilience of the arms tending to cause them to revert to their original outward position. The gripping engagement is further augmented by the bridging element 8 which will be initially flexed inwardly with the arms but will tend to revert to its original position thereby urging the arms against the edge of the aperture.

The concavo/convexo shape of the bridge element 8 has the advantage that it provides three points of flexing, namely, at the junction of the opposite ends of the bridge element with the arms 6, 7, as indicated by 8a, 8b and along the transverse line 8c which is coincident with the radius of curvature of the concave surface.

The stud is particularly adapted for securing a trim pad to a panel forming part of the body of a motor vehicle in which case the pad and panel will be formed with a series of aligned apertures having a diameter slightly less than the maximum distance between the shoulders 9 on the arms 6, 7. The trim pad will normally have a thickness substantially greater than the panel to which it is to be attached, and accordingly the dimensions of the neck and arms of the stud will be such that when the stud is inserted through the apertures in the pad and panel the head 1 will abut the outer face of the pad and the arms 6, 7, will make frictional gripping engagement with the edges of the aperture in the panel so that the shoulders 9 overlie the face of the panel remote from the pad. The stud will serve to substantially close the apertures against the entry of dust and moisture. If a perfect seal of the apertures is required, a thin sheet of flexible synthetic plastics such as polythene is interposed between the trim pad and the panel so that when the stud is inserted through the apertures it will engage the polythene sheet and draw part of it through the apertures so as to form a seal. The polythene sheet being very flexible can be readily drawn into the apertures without danger of tearing. A portion of the sheet surrounding the aperture will be clamped between the trim pad and the panel and the portion of the sheet drawn into the aligned apertures will be clamped by the arms to the edges of the aperture in the panel.

The ends of the arms adjacent the bridge element are tapered inwardly to provide a lead-in to facilitate the insertion of the arms into the apertures in the trim pad and panel.

We claim:

1. A fastener stud for snapping engagement into an aperture in a support, the stud being formed as a one-piece moulding of resilient synthetic plastics comprising a head, a neck integral with the head, a pair of flexible arms extending from the neck in spaced parallel relation to one another and an integral flexible bridging element connecting the free ends of said arms, said bridging element having a concave surface directed away from the head and a convex surface directed toward the head.

2. A fastener stud according to claim 1, wherein a base element is integral with said neck at the end remote from said head, the base being disposed in substantially parallel relation to the head.

3. A fastener stud according to claim 1, wherein the outer surface of each said arm is shaped to provide outwardly and inwardly sloping surfaces defining a shoulder at the junction of the inner ends of said surfaces.

References Cited

UNITED STATES PATENTS

| | | |
|---|---|---|
| 3,029,486 | 4/1962 | Raymond. |
| 3,110,068 | 11/1963 | Perrochat. |
| 3,053,046 | 9/1962 | Fleming. |
| 3,130,822 | 4/1964 | Meyer. |

DONALD A. GRIFFIN, *Primary Examiner*.